United States Patent [19]
Kawashima et al.

[11] Patent Number: 5,898,051
[45] Date of Patent: Apr. 27, 1999

[54] ELASTIC FLUOROHYDROCARBON RESIN-BASED POLYMER BLEND WITH GRAFT COPOLYMERS OF RUBBERS

[75] Inventors: Chikashi Kawashima, Tokyo; Fumiyoshi Yoshikawa; Seiiti Minegishi, both of Moroyama, all of Japan

[73] Assignee: Central Glass Company, Limited, Yamaguchi, Japan

[21] Appl. No.: 08/594,208

[22] Filed: Jan. 31, 1996

[51] Int. Cl.$^6$ .............................. C08L 27/12; C08L 51/00
[52] U.S. Cl. .................................................. 525/71; 525/72
[58] Field of Search ......................................... 525/71, 72

[56] References Cited

U.S. PATENT DOCUMENTS

| | | |
|---|---|---|
| 4,200,568 | 4/1980 | Trautvetter et al. . |
| 4,508,875 | 4/1985 | Kishida et al. . |
| 4,575,533 | 3/1986 | Horie et al. . |
| 4,840,994 | 6/1989 | Moggi et al. . |
| 4,868,036 | 9/1989 | Robinet . |
| 4,988,548 | 1/1991 | Takemura et al. . |
| 5,051,480 | 9/1991 | Coran . |
| 5,053,450 | 10/1991 | Coran . |
| 5,219,931 | 6/1993 | Siol et al. . |

FOREIGN PATENT DOCUMENTS

| | | |
|---|---|---|
| 34-8136 | 6/1956 | Japan . |
| 42-22541 | 11/1967 | Japan . |
| 55-35042 | 9/1980 | Japan . |
| 61-16769 | 5/1986 | Japan . |
| 62-68844 | 3/1987 | Japan . |
| 62-34324 | 7/1987 | Japan . |
| 2-135269 | 5/1990 | Japan . |
| 4-100812 | 4/1992 | Japan . |
| 4-224939 | 8/1992 | Japan . |
| 4-370133 | 12/1992 | Japan . |

OTHER PUBLICATIONS

Lee et al. "The Glass Transition Temperatures of Polymers", Polymer Handbook, 2nd ed., Brandrup et al. ed., John Wiley & Sons, pp. III–139–142 (1975).

"Standard Test Method for Glass Transition Temperatures by Differential Scanning Calorimetry or Differential Thermal Analysis", ASTM E–1356 (Reapproved 1995) (1995).

*Primary Examiner*—Donald R. Wilson
*Attorney, Agent, or Firm*—Evenson, McKeown Edwards & Lenahan P.L.L.C.

[57] ABSTRACT

The invention provides a fluorine-containing resin blend. This resin blend includes 100 parts by weight of a first resin and 1–50 parts by weight of a second resin. The first resin is one of an elastic fluorohydrocarbon resin and a vinylidene fluoride based resin. The second resin is a graft copolymer prepared by graft copolymerization of a rubber-like polymer with a first monomer and an optional second monomer. The first monomer is at least one of an acrylic ester and a methacrylic acid ester. The optional second monomer is at least one copolymerizable monomer other than the first monomer. When the elastic fluorohydrocarbon resin is used as the first resin, the resin blend is improved in extensibility upon molding in a melted condition and lowered in modulus of elasticity under a condition that the resin blend is strained by up to 20%, without impairing the elastic fluorohydrocarbon in its heat resistance, low-temperature characteristics and the like. When the vinylidene fluoride based resin is used as the first resin, the resin blend is improved in mechanical strength at low temperature, without impairing superior characteristics of the vinylidene fluoride based resin.

17 Claims, No Drawings

ELASTIC FLUOROHYDROCARBON RESIN-BASED POLYMER BLEND WITH GRAFT COPOLYMERS OF RUBBERS

BACKGROUND OF THE INVENTION

The present invention relates to a fluorine-containing resin blend of first, and second resins. The first resin is one of an elastic fluorohydrocarbon resin and a vinylidene fluoride based resin. The second resin is mixed with the first resin for improving characteristics of the resin blend.

Fluororesins are widely used in various fields by reason of their characteristic properties attributed to the presence of C-F bond, such as good heat resistance, high resistance to oils and many other chemicals and good weather resistance. In particular, elastic fluororesins having softness and moldabililty are widely used as electrical wire covering, tubes, and composite tent materials. For example, Japanese Patent Examined Publication JP-B-62-34324 discloses an elastic fluorohydrocarbon (EFHC) resin which is superior in softness and moldability. This resin has a trunk polymer (i.e., a fluorine-containing elastic polymer) and a branch polymer (i.e., polyvinylidene fluoride). This resin can be molded under melted condition at a relatively low temperature into a tube, an electrical wire covering, a sheet, a film, and the like, with an extruder, an injection molding machine, a calender or the like.

There are proposals of resin blends each containing the EFHC resin and another resin, for improving characteristics of the resin blends as compared with the EFHC resin. For example, Japanese Patent Unexamined Publication J1P-A-62-68844 discloses a resin blend containing a first resin which is the EFHC resin having a branch polymer of vinylidene fluoride (VDF) polymer, and a second resin which is the VDF polymer or, for example, a copolymer of VDF and hexafluoroacetone (HFA). This resin is improved in mechanical strength at high temperature or water repellency. As another example, JP-A-2-135269 discloses a mixture of a first solution containing the EFHC resin dissolved in a polar solvent and a second solution containing a methyl methacrylate resin dissolved in an organic solvent. As still another example, JP-A-4-370133 discloses a resin blend containing the EFHC resin and a thermoplastic urethane resin.

Of fluororesins, VDF based resin referring to PVDF or to VDF copolymer is widely known as being resistant against corrosive chemicals and ultraviolet rays and as being superior in mechanical characteristics. VDF based resin is particularly superior in extrudability and meltability for use as a powder coating or the like. Therefore, VDF based resin is widely used as an anticorrosion coating for metal and as an electric wire coating. Furthermore, VDF has a superior characteristic as a barrier to gases, as compared with other fluororesins. For example, JP-A-4-224939 discloses a fuel distributing resin tube having an inner layer of PVDF and an outer layer of polyamide resin. PVDF is widely used in the field of paint. In particular, PVDF has been used for long as a paint for precoated metal.

PVDF is a crystalline polymer and thus is insufficient in softness. In view of this, there are proposals of resin compositions each of which contains PVDF and is improved in softness as compared with PVDF itself. For example, JP-B-55-35042 discloses a resin composition containing PVDF and a methyl acrylate resin, which is improved in softness and extensibility. As another example, JP-B-61-16769 discloses a resin composition containing the above-mentioned EFHC resin and PVDF, which is improved in impact resistance and low-temperature characteristics.

SUMMARY OF THE INVENTION

It is an object of the present invention to provide a fluorine-containing resin blend comprising a first resin which is an elastic fluorohydrocarbon resin and a second resin, which resin blend is improved in extensibility upon molding under a melted condition and is lowered in modulus of elasticity under a condition that the resin blend is strained by up to 20%, without impairing the elastic fluorohydrocarbon resin in its heat resistance, low-temperature characteristics and the like.

It is another object of the present invention to provide a fluorine-containing resin blend comprising a first resin which is a vinylidene fluoride based resin and a second resin, which resin blend is improved in mechanical strength at low temperature, without impairing superior characteristics of the vinylidene fluoride based resin.

According to the present invention, there is provided a fluorine-containing resin blend comprising 100 parts by weight of a first resin and 1–50 parts by weight of a second resin. The first resin is one of an elastic fluorohydrocarbon resin and a vinylidene fluoride based resin. The second resin is a first graft copolymer prepared by graft copolymerization of a rubber-like polymer with a first monomer and an optional second monomer. The first monomer is at least one monomer selected from the group consisting of acrylic esters and methacrylic acid esters. The optional second monomer is at least one copolymerizable monomer other than the first monomer.

When the elastic fluorohydrocarbon resin is used as the first resin, the rubber-like polymer is capable of lowering the modulus of elasticity of the resin blend under a condition that the resin blend is strained by up to 20%, as compared with that of the elastic fluorohydrocarbon resin itself. It is, however, difficult to uniformly mix the rubber-like polymer itself with the elastic fluorohydrocarbon resin, because both of the elastic fluorohydrocarbon resin and the rubber-like polymer have high melt viscosities. In view of this fact, the inventors unexpectedly found that the above-mentioned first graft copolymer of the rubber-like polymer can be uniformly mixed with the elastic fluorohydrocarbon resin and thus that the resin blend is improved in extensibility upon molding in a melted condition and lowered in modulus of elasticity under a condition that the resin blend is strained by up to 20%, without impairing the elastic fluorohydrocarbon resin in its heat resistance, low-temperature characteristics and the like. Therefore, this resin blend can be substantially effectively used as a material for tube, electrical wire covering and the like, and for preparing a composite film with another cloth.

When the vinylidene fluoride based resin is used as the first resin, the rubber-like polymer is capable of improving mechanical strength of the resin blend at low temperature, as compared with that of the vinylidene fluoride based resin itself. It is, however, difficult to uniformly mix the rubber-like polymer itself with the vinylidene fluoride based resin, because both of the vinylidene fluoride based resin and the rubber-like polymer have high melt viscosities. In view of this fact, the inventors unexpectedly found that the above-mentioned first graft copolymer of the rubber-like polymer can be also uniformly mixed with the vinylidene fluoride based resin and thus that the resin blend is improved in mechanical strength at low temperature, without impairing superior characteristics (i.e., heat resistance, weathering resistance, and the like) of the vinylidene fluoride based resin. Therefore, this resin blend can be substantially effectively used as a material which is optionally mixed with another material, for preparing a fuel distributing tube, a fuel container, and the like.

The above-mentioned first graft copolymer has a trunk polymer (i.e. the rubber-like polymer) and a branch polymer which is a thermoplastic resin compatible with both of the elastic fluorohydrocarbon resin and the vinylidene fluoride based resin. This branch polymer is prepared by graft copolymerization of the first monomer and the optional second monomer with the rubber-like polymer.

DESCRIPTION OF THE PREFERRED EMBODIMENTS

In the following, a fluorine-containing resin blend according to the present invention will be described in detail. The resin blend comprises first and second resins. The first resin is one of an elastic fluorohydrocarbon (EFHC) resin and a vinylidene fluoride (VDF) based resin. The second resin is a first graft copolymer prepared by graft copolymerization of a rubber-like polymer with a first monomer and an optional second monomer.

The EFHC resin is a second graft copolymer prepared by a graft copolymerization of a fluorine-containing elastomer (i.e., a trunk polymer) with at least one fluorine-containing monomer, under a condition in which this elastomer is dispersed in a liquid medium. This second graft copolymer has a fluorine-containing crystalline branch polymer not lower than 130° C. in melting temperature. The fluorine-containing elastomer has a glass transition temperature below room temperature and is prepared by copolymerizing at least one third fluorine-containing monomer and at least one fourth monomer having (i) at least one double bond and (ii) at least one peroxy bond.

Examples of the at least one fourth monomer are unsaturated peroxy esters such as t-dutyl peroxymethacrylate and t-butyl peroxycrotonate, and unsaturated peroxycarbonates such as t-butyl peroxyallylcarbonate and p-menthane peroxyallylcarbonate.

The fluorine-containing elastomer is not particularly limited in composition. Examples of this elastomer are copolymers of VDF and hexafluoropropene (HFP), ternary copolymers of VDF, HFP and tetrafluoroethylene (TFE), and copolymers of VDF and chlorotrifluoroethylene (CTFE).

Examples of the fluorine-containing crystalline branch polymer are polytetrafluoroethylene, polychlorotrifluoroethylene, polyvinyl fluoride, polyvinylidene fluoride (PVDF), copolymers of VDF and TFE, copolymers of VDF and HFP, ternary copolymers of VDF, HFP and TFE, copolymers of VDF and hexafluoroacetone (HFA), copolymers of VDF and CTFE, and copolymers of TFE and a fluorine-containing vinyl ether.

An EFHC resin which is particularly preferable in the invention is prepared by graft copolymerization of 100 parts by weight of the trunk polymer with 20–80 parts by weight of VDF based monomer. If the VDF based monomer is less than 20 parts by weight, the EFHC resin may become too high in melt viscosity. With this, it may become difficult to conduct the molding of the resin blend under a melted condition by extrusion, injection molding or the like. If the VDF based monomer is more than 80 parts by weight, the EFHC resin may become too hard, thereby impairing softness of the resin blend.

The particularly preferable EFHC resin has, for example, a melting temperature of 170° C. which allows the resin blend to undergo a molding under melted condition at a temperature from 190 to 220° C., a glass transition temperature of about −20° C. as determined by differential scanning calorimetry, and a brittleness temperature of about −50° C. as specified in Japanese Industrial Standard (JIS) K6301.

The VDF based resin used as the first resin is a polymer prepared by polymerization of only VDF, or a copolymer of VDF and at least one other monomer having a mol fraction of 0.20 or less. If it exceeds 0.20, the PVDF is impaired in characteristics as a barrier to fuel permeation and the like. Examples of the at least one other monomer are HFP, TFE, CTFE, HFA, and mixtures of at least two of these.

In the invention, it is optional to mix the VDF based resin as the first resin, with at least one other resin other than the second resin. For example, when 100 parts by weight of the VDF based resin is mixed with up to 100 parts by weight of the EFHC resin as the at least one other resin, the resin blend is improved in softness, without impairing the VDF based resin in fuel permeability and low-temperature brittleness. If the amount of the at least one other resin exceeds 100 parts by weight, the resin blend is impaired in characteristic as a barrier to fuel permeation.

In general, a rubber-like polymer is referred to as having a glass transition temperature below room temperature (e.g., 25° C.). In this invention, however, its glass transition temperature is preferably not higher than −20° C., for the purpose of not impairing characteristics of the EFHC at low temperature, and more preferably not higher than −40° C., for the purpose of allowing the resin blend to pass a low-temperature falling-ball impact test at −40° C., as specified in U.S. Society of Automotive Engineers (SAE) standard J844. The glass transition temperature is determined by thermal analysis, using a differential scanning calorimeter (DSC). Furthermore, a rubber-like polymer according to this invention is referred to as not having the fluoroolefin unit.

Examples of the rubber-like polymer are polybutadiene rubber, styrene-butadiene rubber, polyalkylacrylate rubber, polyalkylmethacrylate rubber, polyorganosiloxane rubber, and mixtures of at least two of these rubbers. The rubber-like polymer is not particularly limited in composition, in polymer structure, in mixing manner in case that it is a mixture of at least two rubbers, and in production method thereof. It is preferable that the rubber-like polymer is prepared by emulsion polymerization. With this, it is easy to prepare the rubber-like polymer in the form of latex or powder.

It is preferable that the first monomer to be copolymerized with the rubber-like polymer is in amount of at least 50 wt %, based on the total weight of the first monomer and the optional second monomer. If it is less than 50 wt %, the first graft copolymer of the rubber-like polymer may be insufficient in compatibility with both of the EFHC resin and the VDF based resin. With this, low-temperature mechanical characteristics (e.g., brittleness temperature) of the resin blend may become unsatisfactory.

It is preferable that the acrylic ester as the first monomer is an acrylic alkyl ester having an alkyl group having a carbon atom number from 1 to 8. Examples of the acrylic ester are methyl acrylate, ethyl acrylate, isopropyl acrylate, n-butyl acrylate, isobutyl acrylate, 2-ethylcyclohexyl acrylate, and mixtures thereof. Similarly, it is preferable that the methacrylic acid ester as the first monomer is an methacrylic acid alkyl ester having an alkyl group having a carbon number from 1 to 8. Examples of the methacrylic acid ester are methyl methacrylate, ethyl methacrylate, isopropyl methacrylate, n-butyl methacrylate, isobutyl methacrylate, 2-ethylcyclohexyl methacrylate, and mixtures thereof. Of these examples of the acrylic ester and the methacrylic acid ester, methyl methacrylate is particularly preferable.

The second optional monomer to be copolymerized with the rubber-like polymer is not particularly limited, as long as it has a copolymerizable double bond in the molecule. The second optional monomer is preferably an aromatic vinyl monomer. Examples of this vinyl monomer are styrene, α-methylstyrene, nuclear substitution derivatives thereof (e.g., vinyl toluene, isopropenyl toluene, and chlorostyrene), and mixtures of at least two of these.

It is preferable that the first graft copolymer contains 50–99 wt % of the rubber-like polymer. If it is less than 50 wt %, the EFHC resin may not be satisfactorily softened. Furthermore, if it is less than 50 wt %, a large amount of this first graft copolymer may be necessary for improving low-temperature characteristics of the resin blend. With this, the VDF based resin may be impaired in chemical resistance, heat resistance, and the like. If it is greater than 99 wt %, the first graft copolymer may be insufficient in compatibility with the EFHC resin. With this, low-temperature characteristics of the resin blend such as brittleness temperature may become unsatisfactory.

The method of preparing the first graft copolymer is not particularly limited. For example, there is a method comprising the steps of: (a) preparing the rubber-like polymer in the form of latex; (b) adding the first monomer and the second optional monomer to the rubber-like polymer to obtain a first graft copolymer; and (c) drying the first graft copolymer to obtain a powdery resin. In more detail, there is a method in which a monomer that is methyl methacrylate or methyl methacrylate and styrene is polymerized in an aqueous latex of a polymer that is polybutadiene or styrene-butadiene copolymer rubber, thereby obtaining a graft copolymer (see JP-B-34-8136 and JP-B-42-22541). There is another method in which a vinyl monomer containing an acrylic ester and/or a methacrylic acid ester is polymerized in a mixture of a first rubber latex of polyorganosiloxane and a second rubber latex of polyalkylacrylate and/or polyalkylmethacrylate (see JP-A-4-100812).

As the first graft copolymer, it is optional to use a commercial resin prepared by graft copolymerization of a rubber-like polymer with a monomer which is an acrylic ester and/or a methacrylic acid ester and another optional copolymerizable monomer. This commercial resin is widely used as an impact-resistance improving agent for vinyl chloride resin. Examples of commercial products of the first graft copolymer are KANEACE B SERIES (trade name) which is a MBS (methyl methacrylate/butadiene/styrene) resin made by Kanegafuchi Chemical Industries Co., KANEACE FM (trade name) which is a resin prepared by graft copolymerization of an acrylic elastomer (rubber) made by Kanegafuchi Chemical Industries Co. with a vinyl monomer containing methyl methacrylate, and METABLEN S SERIES (trade name) which is a resin prepared by graft copolymerization of a mixture of a first rubber latex of polyorganosiloxane and a second rubber latex of polyalkylacrylate and/or polyalkylmethacrylate, with a vinyl monomer containing a methacrylic acid ester.

It is preferable that the mixing ratio of the first graft copolymer to the first resin (i.e., one of the EFHC resin and the VDF based resin) is within a range from 1:100 to 50:100 by weight. If the mixing ratio is less than this range, characteristics of the resin blend are not improved as compared with those of the first resin. If the mixing ratio is more than this range, the resin blend becomes too high in melt viscosity. With this, it becomes difficult to stably mold the resin blend, and chemical resistance of the resin blend is impaired.

It is preferable that the first and second resins are mixed together by a melt kneading method, using two rollers, extruder and the like. However, these resins may be dissolved in an organic solvent containing a polar solvent such as dimethylformamide (DMF) and then mixed together.

The following examples are illustrative of the present invention, but these examples are not limitative.

EXAMPLE 1

(A) Preparation of EFHC Resin

At the first step, 50 kg of purified water, 100 g of potassium persulfate, 150 g of ammonium perfluorooctanoate and 100 g of t-butyl peroxyallylcarbonate were introduced into a 100-liter stainless steel autoclave, and, after exhausting the gas atmosphere of the autoclave, 12.5 kg of VDF monomer and 7.55 kg of CTFE monomer were additionally charged into the autoclave. The resultant mixture was subjected to polymerization reaction at 50° C. for 20 hr with continuous stirring. The product of the reaction had an appearance of white latex, and by a salting-out treatment it turned into a rubber-like powder. The powder was washed with water, dried in vacuum, then washed with n-hexane to completely remove unreacted residue of t-butyl peroxyallylcarbonate and again dried in vacuum. With this, 16 kg of a copolymer (i.e. the fluorine-containing elastomer) was obtained in the form of white powder.

A characteristic curve obtained by thermal analysis of the elastomer by using a differential scanning calorimeter (DSC) exhibited an exothermic peak at 160–180° C. By iodimetric titration, the content of active oxygen in the copolymer was measured to be 0.042%.

At the second step, 12 kg of the thus obtained elastomer and 75 kg of R-113 (1,1,2-trichlorotrifluoroethane) were introduced into a 100-liter stainless steel autoclave. After exhausting the gas atmosphere of the autoclave, 6 kg of VDF monomer was additionally charged into the autoclave, and the resultant mixture was subjected to graft copolymerization reaction at 95° C. for 24 hr.

A copolymer formed by this reaction was separated from the solvent and dried to obtain 16.6 kg of white powder (i.e. the EFHC resin). By the calculation from the yield, it was found that 38.3 parts by weight of VDF monomer underwent graft copolymerization with 100 parts by weight of the elastomer obtained by the first step.

(B) Preparation of Resin Blend

The above-prepared EFHC resin and KANEACE FM (the second resin), that is, a resin which is prepared by graft copolymerization of an acrylic rubber with a vinyl monomer containing methyl methacrylate and made by Kanegafuchi Chemical Industries Co. were mixed together in amounts as specified in Table 1, by a 20-liter Henschel mixer. Each mixture was pelletized at a temperature from 180 to 200° C. by an extruder having a L/D of 22 and an aperture size of 30 mm to prepare a resin blend.

(C) Melt Extensibility Test

The thus prepared pellets were subjected to a melt extensibility test with a capillograph of Toyo Seiki Co. In this test, a barrel heated at 200° C. was charged with the pellets. Then, the melted pellets were extruded in the form of melted strand, at a rate of 10 mm/sec, from an orifice which has a size of 1×10 mm φ and is provided at the bottom of the barrel. Then, this melted strand was rolled round a variable speed roller while the roller speed was continuously increased. Under this condition, a roller speed (m/s) when the strand was broken was measured as the result. This result is shown in Table 1.

(D) Preparation of Sheet from Pellets

The above prepared pellets were kneaded with two rollers having a heating device, at 170° C. for 3 minutes. The thus kneaded resin blend was drawn in the form of sheet. Then, this was shaped into a sheet having a thickness of 2 mm and widths of 150 mm with a compression molding machine at 200° C. under a pressure of 60 kgf/cm².

(E) Tensile Strength Test

The thus prepared sheet was subjected to a tensile strength test. In this test, the sheet was punched to obtain a No. 3 dumbbell-shape sample piece as specified in JIS K6301. Then, a tensile load was added to this sample piece by an Instron-type tensile strength tester. When the sample piece was elongated by 10%, modulus of elasticity (kgf/cm²) was measured. Furthermore, the strength at break and the elongation at break of the sample piece were respectively measured. The results are shown in Table 1.

(F) Low-Temperature Impact Brittleness Test

The above-prepared sheet was punched to obtain a sample piece having a width of 6.3 mm and a length of 32 mm as specified in JIS K6301 (14) "Low-Temperature Impact Brittleness Test". Then, the sample pieces were subjected to a low-temperature impact brittleness test, while the temperature was changed. The maximum temperature when at least 50% of all the tested sample pieces were broken was judged as brittleness temperature. The result is shown in Table 1. It is understood from Table 1 that the brittleness temperatures according to Example 1 were slightly lower than that according to the aftermentioned Referential Example 1 in which the second resin was omitted. With this, it is understood that, according to Example 1, the first and second resins were well mixed together in the resin blend.

EXAMPLE 2

In this example, Example 1 was repeated except in that METABLEN S 2001 (trade name) was used as the second resin in place of KANEACE FM. METABLEN S 2001 is made by Mitsubishi Rayon Co. and a resin prepared by graft copolymerization of a rubber latex mixture with a vinyl monomer containing a methacrylic acid ester. This rubber latex mixture is a mixture of a first rubber latex of polyorganosiloxane and a second rubber latex of polyalkylacrylate and/or polyalkylmethacrylate.

Similar to Example 1, it is understood from Table 1 that the brittleness temperatures according to Example 2 were slightly lower than that according to the aftermentioned Referential Example 1. With this, it is understood that, according to Example 2, the first and second resins were well mixed together in the resin blend.

Referential Example 1

In this referential example, Example I was repeated except in that the second resin was omitted. In other words, the pellets were prepared from only the EFHC resin for conducting the evaluation tests.

Comparative Example 1

In this comparative example, Example 1 was repeated except in that ACRYPET MF (trade name) was used as the second resin not according to the invention, in place of KANEACE FM. This resin made by Mitsubishi Rayon Co. is a methyl methacrylate resin. It is understood from Table 1 that modulus of elasticity at 10% elongation according to this comparative example is higher than those according to Examples 1–2 and that brittleness temperatures according to this comparative example are higher than that according to Referential Example 1.

Comparative Example 2

In this comparative example, the EFHC resin according to Example 1 and an acrylic rubber as the second resin not according to the invention were kneaded together by two rollers heated at 170° C., for 3 minutes. This acrylic rubber has a trade name of NIPOL AR54 which is made by Nippon Zeon Co. and has a glass transition temperature of −37° C.. The thus kneaded mixture was drawn in the form of sheet. Then, this was shaped into a sheet having a 2 mm thickness and widths of 150 mm by a compression molding machine at 200° C. under a pressure of 60 kgf/cm². Using this sheet, the evaluation tests of Example 1 were conducted. It is understood from Table 1 that the result of melt extensibility test of this comparative example is inferior to those of Examples 1–2.

TABLE 1

| | Resin Blend Composition | | | Tensile Strength Test | | | |
|---|---|---|---|---|---|---|---|
| | First Resin (EFHC Resin) (parts by weight) | Second Resin (parts by weight) | Melt Extensibility (m/s) | Modulus of Elasticity at 10% Elongation (kgf/cm²) | Strength at Break (kgf/cm²) | Elongation at Break (%) | Brittleness Temp. (° C.) |
| Example 1 | 100 | KANEACE FM (10) | 7.9 | 605 | 220 | 380 | −51 |
| Example 1 | 100 | KANEACE FM (20) | 8.2 | 552 | 205 | 406 | −53 |
| Example 1 | 100 | KANEACE FM (30) | 7.1 | 513 | 195 | 390 | −55 |
| Example 2 | 100 | METABLEN S2001 (10) | 5.3 | 510 | 210 | 395 | −61 |
| Example 2 | 100 | METABLEN S2001 (20) | 6.5 | 456 | 204 | 357 | −69 |
| Example 2 | 100 | METABLEN S2001 (30) | 5.1 | 403 | 205 | 330 | −70 |
| Ref. Ex. 1 | 100 | — | 2.1 | 850 | 225 | 417 | −50 |
| Com. Ex. 1 | 100 | ACRYPET MF (10) | 9.1 | 1070 | 350 | 280 | −20 |
| Com. Ex. 1 | 100 | ACRYPET MF (20) | 10.2 | 1410 | 395 | 280 | −18 |

TABLE 1-continued

|  | Resin Blend Composition | | Melt Extensibility (m/s) | Tensile Strength Test | | | |
|---|---|---|---|---|---|---|---|
|  | First Resin (EFHC Resin) (parts by weight) | Second Resin (parts by weight) |  | Modulus of Elasticity at 10% Elongation (kgf/cm²) | Strength at Break (kgf/cm²) | Elongation at Break (%) | Brittleness Temp. (° C.) |
| Com. Ex. 1 | 100 | ACRYPET MF (30) | 11.1 | 1850 | 380 | 252 | −15 |
| Com. Ex. 2 | 100 | Acrylic Rubber (10) | 1.0 | 480 | 178 | 210 | −30 |
| Com. Ex. 2 | 100 | Acrylic Rubber (20) | 1.0 | 410 | 152 | 205 | −27 |
| Com. Ex. 2 | 100 | Acrylic Rubber (30) | 0.9 | 380 | 130 | 160 | −25 |

EXAMPLE 3

(A) Preparation of Resin Blend

At first, KYNAR 710 (trade name) pellets of ATOCHEM Co. as a PVDF (i.e., the first resin) and KANEACE FM (the second resin) of Example 1 were mixed together in amounts specified in Table 2 by a drum tumbler for 10 minutes. Each mixture was pelletized by an extruder having an aperture size of 30 mm and a L/D ratio of 22 at a temperature from 200 to 220° C.. The glass transition temperature of the second resin was measured by a DSC7-type differential scanning calorimeter made by Perkin Elmar Co.

(B) Preparation of Sheet from Pellets

The above prepared pellets were extruded by the extruder at a temperature from 200 to 220° C. into a sheet having a thickness of 2 mm and a width of 65 mm.

(C) Low-Temperature Impact Brittleness Test

The same low-temperature impact brittleness test procedure as that of Example 1 was repeated. The results are shown in Table 2.

(D) Preparation of Tube

The above prepared pellets were extruded by the extruder at a temperature from 200 to 220° C. into a tube having an inner diameter of 6 mm and an outer diameter of 8 mm.

(E) Low-Temperature Falling Ball Impact Test

The above prepared tube was subjected to a low-temperature falling ball impact test at −40° C., as specified in U.S. SAE standard J844d. In this test, a ball was allowed to fall against the tube from a height of 304.8 mm. This ball had a weight of 0.454 kg, a diameter of 31.75 mm, and a radius of curvature of the bottom surface of 15.88 mm. The result is shown in Table 2 by the ratio of the number of the broken tubes to the number of all the tested tubes.

(F) Preparation of Film

The above prepared pellets were extruded by the extruder at a temperature from 200 to 220° C. into a film having a thickness of 0.5 mm and a width of 120 mm.

(G) Measurement of Fuel Permeability

At first, an aluminum round container was charged with 85 ml of a fuel mixture (Fuel C) and 15 ml of methanol. This container had a height of 50 mm and a bottom plate having a diameter ($\phi$) of 66 mm and an area of 34.2 cm². This container was formed at an upper portion thereof with a threaded portion, so that the container was allowed to be sealingly covered with a film. The fuel mixture was a mixture of I part by volume of isooctane and 1 part by volume of toluene. Then, the container was sealingly covered with a laminate of metal net and the above prepared film having a thickness of 0.5 mm and a diameter ($\phi$) of 85 mm. Then, the container was put upside down so as to allow the fuel mixture to be in contact with the film. Under this condition, the container was put into an explosion-proof oven, followed by the measurement of the weight change of the container with the passage of time. The result is shown in Table 2 as the fuel permeability at 60° C. (g·mm/mm²·day).

EXAMPLE 4

In this example, Example 3 was repeated except in that METABLEN S2001 was used as the second resin in place of KANEACE FM. The results are shown in Table 2. As shown in Table 2, METABLEN S2001 has glass transition temperatures of −50° C. and −92° C., because the rubber-like polymer of METABLEN S2001 is a mixture of two different resins.

EXAMPLE 5

At first, PVDF of Example 3, the EFHC resin of Example 1, and METABLEN S2001 were mixed together in amounts specified in Table 2 by a drum tumbler for 10 min. Then, this resin blend was pelletized at a temperature from 200 to 220° C. by an extruder having an aperture size of 30 mm and a L/D of 22. Using the thus prepared pellets, the procedures of Example 3 were repeated. The results are shown in Table 2.

EXAMPLE 6

In this example, Example 4 was repeated except in that KF-1500 (trade name) of Kureha Chemical Industries Co. was used as the first resin in place of PVDF. KF-1500 is a VDF-CTFE copolymer resin having a molar ratio of VDF monomer unit to CTFE monomer unit of 95:5. The results are shown in Table 2.

Referential Example 2

In this referential example, Example 3 was repeated except in that the second resin was omitted and that only the PVDF pellets were respectively molded into a sheet and a tube as specified in Example 3, at a temperature from 220 to 240° C.

Comparative Example 3

In this example, Example 3 was repeated except in that PARALOID B-66 (trade name) of Loam & Hearse Co. in the form of pellets was used as the second resin not according to the invention, in place of KANEACE FM. PARALOID B-66 is a copolymer of methyl methacrylate and butyl methacrylate. It is understood from Table 2 that low-temperature characteristics were substantially inferior to those of Examples 3–6.

Comparative Example 4

In this example, Example 3 was repeated except in that KYNAR 7200 (trade name) of ATOCHEM Co. in the form of pellets was used as the first resin in place of the PVDF, that the second resin was omitted, and that only KYNAR 7200 pellets were respectively molded into a sheet and a tube as specified in Example 3, at a temperature from 220 to 240° C.. KYNAR 7200 is a VDF-TFE copolymer resin containing 22 mol% of TFE. It is understood from Table 2 that low-temperature characteristics were satisfactory, but the fuel permeability was substantially inferior to those of Examples 3–6.

TABLE 2

| | Resin Blend Composition | | Glass Transition | Low-temp. Impact Test | | |
|---|---|---|---|---|---|---|
| | First Resin (parts by weight) | Second Resin (parts by weight) | Temp. of Second Resin (° C.) | Brittleness Temp. (° C.) | (Ratio of Broken Tubes to Tested Tubes) | Fuel Permeability (g · mm/m$^2$ · day) |
| Example 3 | PVDF (100) | KANEACE FM (10) | −48 | −50 | 4/10 | 6.5 |
| Example 3 | PVDF (100) | KANEACE FM (20) | −48 | −55 | 2/10 | 8.1 |
| Example 3 | PVDF (100) | KANEACE FM (30) | −48 | −60 | 0/10 | 10.3 |
| Example 4 | PVDF (100) | METABLEN S2001 (10) | −50 & −92 | −55 | 3/10 | 5.1 |
| Example 4 | PVDF (100) | METABLEN S2001 (20) | −50 & −92 | −65 | 0/10 | 7.5 |
| Example 5 | PVDF (100) & EFHC resin (15) | METABLEN S2001 (15) | −50 & −92 | −60 | 0/10 | 9.5 |
| Example 6 | VDF-CTFE copolymer (100) | METABLEN S2001 (15) | −50 & −92 | −62 | 0/10 | 8.2 |
| Ref. Ex. 2 | PVDF (100) | — | — | −22 | 10/10 | 3.9 |
| Com. Ex. 3 | PVDF (100) | PARALOID B-66 (10) | 45 | −25 | 10/10 | 5.2 |
| Com. Ex. 3 | PVDF (100) | PARALOID B-66 (20) | 45 | −33 | 10/10 | 7.1 |
| Com. Ex. 4 | VDF-TFE copolymer (100) | — | — | −70 | 0/10 | 40.2 |

What is claimed is:

1. A fluorine-containing resin blend comprising:
100 parts by weight of a first resin which is an elastic fluorohydrocarbon resin; and
1–50 parts by weight of a second resin which is a first graft copolymer prepared by graft copolymerization of a first polymer with a first monomer and an optional second monomer, said first monomer being in an amount of at least 50 wt %, based on a total weight of said first monomer and said optional second monomer, said optional second monomer having a copolymerizable double bond in the molecule, said first polymer having a glass transition temperature below room temperature and being free of a fluoroolefin unit, said first monomer being at least one member selected from the group consisting of acrylic esters and methacrylic acid esters, said optional second monomer being at least one copolymerizable monomer other than said first monomer,
wherein said elastic fluorohydrocarbon resin is a second graft copolymer having a trunk polymer and a branch polymer having a melting temperature of not lower than 130° C., a weight ratio of said branch polymer to said trunk polymer is from 20:100 to 80:100, said branch polymer being selected from the group consisting of polytetrafluoroethylene, polychlorotrifluoroethylene, polyvinyl fluoride, polyvinylidene fluoride, copolymers of vinylidene fluoride and tetrafluoroethylene, copolymers of vinylidene fluoride and hexafluoropropene, ternary copolymers of vinylidene fluoride, hexafluoropropene and tetrafluoroethylene, copolymers of vinylidene fluoride and hexafluoroacetone, copolymers of vinylidene fluoride and chlorotrifluoroethylene, and copolymers of tetrafluoroethylene and a fluorine-containing vinyl ether, said trunk polymer being a fluorine-containing elastomer prepared by copolymerizing at least one third fluorine-containing monomer and at least one fourth monomer having (i) at least one double bond and (ii) at least one peroxy bond, said trunk polymer having a glass transition temperature below room temperatures.

2. A fluorine-containing resin blend, comprising:
100 parts by weight of a first resin which is a vinylidene fluoride based resin being a vinylidene fluoride homopolymer or a copolymer with at least 80 mole % of a vinylidene fluoride;
1–50 parts by weight of a second resin which is a first graft copolymer prepared by graft copolymerization of a first polymer with a first monomer and an optional second monomer,
said first monomer being in an amount of at least 50 wt %, based on a total weight of said first monomer and said optional second monomer, said optional second monomer having a copolymerizable double bond in the molecule,
said first polymer having a glass transition temperature below room temperature and being free of a fluoroolefin unit, said first monomer being at least one selected from the group consisting of acrylic esters and methacrylic acid esters, said optional second monomer being at least one copolymerizable monomer other than said first monomer; and 15–100 parts by weight of a resin other than the second resin, wherein said resin other than the second resin is a second graft copolymer having a trunk polymer and a branch polymer having a melting temperature of not lower than 130° C., a weight ratio of said branch polymer to said trunk polymer is from 20:100 to 80:100, said branch polymer being a member selected from the group consisting of polytetrafluoroethylene, polychlorotrifluoroethylene, polyvinyl fluoride, polyvinylidene fluoride, copolymers of vinylidene fluoride and tetrafluoroethylene, copolymers of vinylidene fluoride and hexafluoropropene, ternary copolymers of vinylidene fluoride, hexafluoropropene and tetrafluoroethylene, copolymers of vinylidene fluoride and hexafluoroacetone, copolymers of vinylidene fluoride and chlorotrifluoroethylene, and copolymers of tetrafluoroethylene and a fluorine-containing vinyl ether, said trunk polymer being a fluorine-containing elastomer prepared by copolymerizing at least one third fluorine-containing monomer and at least one fourth monomer having (i) at least one double bond and (ii) at least one peroxy bond, said trunk polymer having a glass transition temperature below room temperature.

3. A resin blend according to claim 1, wherein said glass transition temperature of said first polymer is not higher than −40° C.

4. A resin blend according to claim 1, wherein said first polymer is one selected from the group consisting of polybutadiene rubber, styrene-butadiene rubber, polyalkylacrylate rubber, polyalkylmethacrylate rubber, polyorganosiloxane rubber, and mixtures of these.

5. A resin blend according to claim 1, wherein said branch polymer is a crystalline polymer having a melting temperature not lower than 130° C.

6. A resin blend according to claim 1, wherein said at least one fourth monomer is selected from the group consisting of unsaturated peroxy esters and unsaturated peroxycarbonates.

7. A resin blend according to claim 6, wherein said at least one fourth monomer is selected from the group consisting of t-butyl peroxymethacrylate, t-butyl peroxycrotonate, t-butyl peroxyallylcarbonate, and p-menthane peroxyallylcarbonate.

8. A resin blend according to claim 1, wherein said trunk polymer is selected from the group consisting of copolymers of vinylidene fluoride and hexafluoropropylene, ternary copolymers of vinylidene fluoride, hexafluoropropylene and tetrafluoroethylene, and copolymers of vinylidene fluoride and chlorotrifluoroethylene.

9. A resin blend according to claim 1, wherein said glass transition temperature of said first polymer not higher than −20° C.

10. A resin blend according to claim 1, wherein said first monomer is at least one of an acrylic alkyl ester having an alkyl group having a carbon atom number from 1 to 8 and a methacrylic acid alkyl ester having an alkyl group having a carbon number from 1 to 8.

11. A resin blend according to claim 10, wherein said acrylic alkyl ester is selected from the group consisting of methyl acrylate, ethyl acrylate, isopropyl acrylate, n-butyl acrylate, isobutyl acrylate, 2-ethylcyclohexyl acrylate, and mixtures thereof, and wherein said methacrylic acid alkyl ester is selected from the group consisting of methyl methacrylate, ethyl methacrylate, isopropyl methacrylate, n-butyl methacrylate, isobutyl methacrylate, 2-ethylcyclohexyl methacrylate, and mixtures thereof.

12. A resin blend according to claim 10, wherein said first monomer is methyl methacrylate.

13. A resin blend according to claim 1, wherein said second optional monomer is at least one monomer selected from the group consisting of aromatic vinyl monomers and derivatives thereof with aromatic-ring substituents.

14. A resin blend according to claim 13, wherein said second optional monomer is at least one selected from the group consisting of styrene, α-methylstyrene, vinyl toluene, isopropenyl toluene, chlorostyrene, and mixtures thereof.

15. A resin blend according to claim 1, wherein said second resin contains 5–99 wt % of said first polymer.

16. A resin blend according to claim 2, wherein said vinylidene fluoride based resin is one of a polyvinylidene fluoride and a copolymer of vinylidene fluoride and at least one other monomer selected from the group consisting of hexafluoropropene, tetrafluoroethylene, chlorotrifluoroethylene, hexafluoroacetone, and mixtures thereof.

17. A resin blend according to claim 1, wherein a glass transition temperature of said elastic fluorohydrocarbon resin is about −20° C.

* * * * *